United States Patent [11] 3,622,606

| [72] | Inventor | Jerome Robert Olechowski<br>Trenton, N.J. |
|---|---|---|
| [21] | Appl. No. | 694,410 |
| [22] | Filed | Dec. 29, 1967 |
| [45] | Patented | Nov. 23, 1971 |
| [73] | Assignee | Cities Service Company<br>New York, N.Y. |

[54] PREPARATION OF COMPLEX TRANSITION METAL SUBHALIDES
8 Claims, No Drawings

[52] U.S. Cl.................................................. 260/429 R,
260/429 AR, 260/429.3, 260/429.5, 260/438.5,
260/439
[51] Int. Cl..................................................... C07f
[50] Field of Search............................................. 260/429
AR, 438.5, 429.5, 429.3, 439, 429, 429 R, 438.5 R

[56] References Cited
UNITED STATES PATENTS

| 2,892,857 | 6/1959 | Ecke et al..................... | 260/438.5 |
|---|---|---|---|
| 3,042,693 | 7/1962 | Coffield et al................. | 260/429 A |
| 3,218,265 | 11/1965 | Rink et al..................... | 260/438.5 |
| 3,231,593 | 1/1966 | Hafner et al.................. | 260/429 A |

OTHER REFERENCES

Fischer et al., Chem. Ber., Vol. 93, pp. 2,065– 2,074 (1960)

*Primary Examiner*—Tobias E. Levow
*Assistant Examiner*—H. M. R. Sneed
*Attorney*—J. Richard Geaman ABSTRACT: Processes are described for the preparation of complex transition metal subhalides by the reaction of an elemental halogen with an arene complex of a transition metal in the zero valence state. Extraction of such reaction mixture with an inert organic solvent for the reactants, which is a nonsolvent for the subhalide, is shown to produce a high-purity product. The use of such subhalides in conjunction with an aluminum alkyl reducing agent as a polymerization catalyst is likewise described.

PREPARATION OF COMPLEX TRANSITION METAL SUBHALIDES

BACKGROUND OF THE INVENTION

1. Field of the Invention

This invention pertains to processes for producing complex transition metal subhalides by reacting an elemental halogen with an arene complex of a transition metal in the zero valence state; e.g. the reaction of bis (benzene) chromium (O) with iodine to produce bis (benzene) chromium subiodide. The invention also relates to the purification of the subhalide product by washing the reaction mixture with an inert solvent for the elemental halogen and arene metal (O) complex which is a nonsolvent for the subhalide, or by conducting the reaction in such solvent and recovering the precipitated subhalide.

2. Description of the Prior Art

A number of methods are known for the preparation of complex transition metal subhalides. Trebellas, Olechowski, Jonassen and Moore have described a process in J. Organometal Chem., 9, 153-8 for the production of a cyclodecadiene rhodium subchloride by the reduction of rhodium trichloride with ethanol in the presence of cyclodecadiene. Wilke and coworkers describe a procedure in Belgian Pat. No. 603,146 for the production of an aluminum chloride adduct of a bis (benzene) chromium subchloride by the reduction of chromic chloride with powdered aluminum in a sealed tube which also contains benzene and aluminum chloride. A process for oxidizing chromium (O) complexes with alkyl halides is shown by Razuvaev and Domrachev in Tetrahedron, 19, 340-3. While each of these methods is effective, difficulties may be encountered in obtaining a high yield of the desired subhalide product because of the presence of reactive by products and the susceptability of the subhalide under these reaction conditions to disproportionation or further oxidation or reduction. Typically these prior art subhalide products are contaminated with large quantities of free metal and/or uncomplexed metal halide.

SUMMARY

It has now been discovered that an elemental halogen reacts rapidly under moderate conditions with an arene complex of a transition metal in its zero valence state to produce a high yield of the corresponding complex metal subhalide. These subhalides are coordination complexes of such arene with a transition metal halide in which the metal atom is present in an average oxidation state that is greater than zero but lower than that of the metal in a stable uncomplexed metal(ous) halide; i.e. the formal valence of the metal in the complex subhalide is between zero and the minimum formal valence of that metal in a stable uncomplexed metal halide. It has also been discovered that subhalides prepared in this manner are surprisingly resistant to disproportionation and that the halogen reacts preferentially with the lower oxidation state metal atoms. Thus, the product of this reaction is remarkably uniform, with no free metal formation and with little if any uncomplexed metal(ous) halide being evident when the quantity of added halogen is less than that theoretically necessary to oxidize all of the available metal atoms to the metalous state.

DESCRIPTION OF THE PREFERRED EMBODIMENTS

As indicated above, elemental halogens have been found to react readily with arene complexes of transition metals in the zero valence state to produce high yields of the corresponding complex transition metal subhalides. The reaction is effected simply by mixing the halogen with the transition metal (O) complex and recovering the resulting complex subhalide product.

These subhalide products are stable compounds containing both formal (noncoordinate) valence bonds between the transition metals and halogen atoms and coordination bonds between the transition metal atoms and the arene molecules. The average formal valence (average oxidation state) of the transition metal in such complex metal subhalide compound is a positive figure below that which would be exhibited by that metal in a stable noncomplexed metal(ous) halide. This average formal valence is largely determined by the relative quantities of transition metal (O) complex and halogen that are employed in the synthesis procedure. While complex transition metal (I) halides can be identified and recovered from reaction mixtures of this invention containing approximately one atom of halogen per atom of transition metal, the metal atoms in products of reactions containing lesser or larger amounts of halogen are often found to exhibit fractional positive formal valences. The precise structure of these fractional valences products is unknown, and applicant does not wish to be bound by any theory as to their structure; however, it is believed that a fractional average metal valence may reflect the presence in a single complex molecule of metal (O) and (I) atoms and, perhaps, additional metal atoms in higher oxidation states or hybrids thereof.

Although one may use any positive quantity of halogen up to that theoretically necessary to oxidize all of the metal (O) complex to a stable uncomplexed metal (ous) halide it is seldom desirable to prepare a complex metal subhalide in which the metal has an average formal valence in excess of one. Accordingly, it is a preferred embodiment of this invention to employ less than about 1.5 atoms of halogen per atom of transition metal. Highly satisfactory results are obtained when this ratio is from about 0.9 to about 1.2.

The reaction of this invention is advantageously conducted in a solvent for the reactants which is a nonsolvent for the subhalide product. Such solvent reactions are faster and more easily controlled than solvent-free reactions and, in addition, yield the subhalide product as an insoluble solid or oily liquid which can easily be separated and which seldom requires further purification. The equivalent purity can, of course, be obtained from a solvent-free reaction mixture by extracting any unreacted metal (O) complex or halogen with a solvent having the properties outlined above. Suitable solvents for the reaction, or extraction of unreacted materials, include liquid hydrocarbons such as n-hexane, n-heptane, n-octane, i-octane, cyclohexane, benzene, toluene and xylene, as well as liquid ethers, such as diethyl ether, dioxane and tetrahydrofuran. Because of the fact that it is readily available and produces outstanding results, diethyl ether is a preferred solvent.

The process of this invention can be performed using any arene complex of any transition metal in its zero valence state; e.g. arene complexes of chromium (O), molybdenum (O), tungsten (O), iron (O), ruthenium (O), titanium (O), zirconium (O) or vanadium (O). A particularly well suited group of reactants is represented by the arene complexes of the Group VIB metals. Exemplary of these preferred reactants are bis (benzene) chromium (O), bis (toluene) chromium (O), bis (mesitylene) chromium (O), bis (tetralin) chromium (O), bis (biphenyl) chromium (O), bis (benzene) molybdenum (O), bis (biphenyl) molybdenum (O), bis (mesitylene) molybdenum (O), bis (benzene) tungsten (O), bis (mesitylene) tungsten (O) and benzene chromium (O) tricarbonyl.

The process of this invention may be conducted at atmospheric or elevated pressures and over a wide temperature range from well below 0° C. to well above 100° C. There is, however, little advantage offered by either the use of high pressures or operation outside a preferred temperature range of from about 10° C. to about 55° C. Advantageously these reactions are conducted at about room temperature under atmospheric pressure. Because of the handling problems associated with the use of gaseous halogens under such conditions, the use of bromine or iodine is generally preferred.

The advantages inherent in the process of the instant invention, as well as numerous modifications thereof, will be evident to those skilled in the art from an examination of the following working examples. Examples I, III, IV, VI and VII are representative of the instant invention, while examples II and V show the use of products thereof as polymerization catalysts.

EXAMPLE I

A clean dry 250 milliliter flask is charged with 125 milliliters of anhydrous ethyl ether, 3 grams of bis (benzene) chromium (O) and 1.83 grams of resublimed iodine and stirred for 5 minutes. A yellow precipitate is separated by filtration, washed with additional anhydrous ethyl ether and dried under vacuum. The yield of this dried precipitate, which is identified as high purity bis (benzene) chromium (I) iodide, is 96.7 percent.

EXAMPLE II

A clean dry magnetically stirred 300 milliliter autoclave is evacuated and charged with 1 gram of the dry bis (benzene) chromium (I) iodide product of example I, 20 grams of dry benzene and 138 grams of 1,3-butadiene. The autoclave is stirred at 40° C. for 24 hours. Butadiene conversion is 50.8 percent with a 54 percent selectivity to cyclic oligomers, including trans, trans, trans and trans, trans, cis isomers of 1,5,9-cyclododecatriene.

EXAMPLE III

The reaction procedure of example II is repeated employing 4 grams of bis (cumene) chromium (O) in place of bis (benzene) chromium (O). After 5 minutes of stirring, the reaction mixture is permitted to settle and a reddish oil, which separates immediately from the ether phase, is removed, extracted with additional ether, dried and identified as predominantly bis (cumene) chromium (I) iodide.

EXAMPLE IV

A clean dry 250 milliliter flask is charged with 50 milliliters of dry benzene. 1 gram of bis (benzene chromium (O) and 0.35 grams of bromine. The mixture is stirred for 5 minutes producing a high yield of bis (benzene) chromium sub-bromide

EXAMPLE V

A clean dry magnetically stirred 300 milliliter autoclave is charged with the entire reaction product and solvent of example IV, 1.6 grams of triethyl aluminum and 81 grams of 1,3-butadiene. The autoclave is heated to 125° C. and held at this temperature for 90 minutes, at which time it is cooled and vented and the catalyst is deactivated by the addition of 50 milliliters of methanol. A high yield of cyclododecatriene is attained.

EXAMPLE VI

The reaction procedure of example I is repeated employing 3.75 grams of bis (benzene) molybdenum (O) in place of bis (benzene) chromium (O). A high yield of bis (benzene) molybdenum subiodide is obtained.

EXAMPLE VII

The reaction procedure of example I is repeated employing 6 grams of bis (cumene) tungsten (O) in place of bis (benzene) chromium (O). A high yield of bis (cumene) tungsten subiodide is Obtained.

I claim:

1. A process for preparing a complex subhalide of a transition metal of Group IVB, VB, or VIII which comprises reacting a mixture of components consisting of an arene complex of said metal in the zero valence state and elemental bromine at a temperature of about 10–55° C., said bromine being employed in a quantity less than that theoretically necessary to oxidize all of said metal to metal(ous) halide.

2. The process of claim 1 wherein the said mixture of components is reacted in solution in an inert solvent.

3. The process of claim 2 wherein said solvent is selected from the group consisting of hydrocarbons and hydrocarbon ethers.

4. Process for producing a complex subhalide of a transition metal selected from the group consisting of titanium, zirconium, vanadium, iron and ruthenium comprising reacting an arene complex of said metal in its zero valence state with an elemental halogen in an inert solvent at a temperature from about 0° C. to about 100° C., said halogen being employed in a quantity less than that theoretically necessary to oxidize all of said metal to metal(ous) halide, and separating the resulting insoluble complex transition metal subhalide from said solvent.

5. The process of claim 4 wherein said less than about 1.5 atoms of bromine or iodine are employed per atom of said metal.

6. The process of claim 5 wherein from about 0.9 to about 1.2 atoms of bromine or iodine are employed per atom of said transition metal.

7. The process of claim 6 wherein said solvent is ethyl ether.

8. The process of claim 4 wherein said solvent is ethyl ether.

* * * * *